United States Patent [19]

Pano

[11] Patent Number: 5,112,164

[45] Date of Patent: May 12, 1992

[54] CUTTING TOOL SYSTEM HAVING AN EXCHANGEABLE ADAPTOR

[75] Inventor: Joseph Pano, Nahariya, Israel

[73] Assignee: Iscar Ltd., Tefen, Israel

[21] Appl. No.: 578,071

[22] Filed: Sep. 5, 1990

[30] Foreign Application Priority Data

Sep. 8, 1989 [IL] Israel ........................... 91574

[51] Int. Cl.⁵ ............................. B26D 1/12
[52] U.S. Cl. ........................... 407/110; 407/91; 82/160
[58] Field of Search ............... 407/101–105, 407/107–110, 50, 46, 91; 82/160

[56] References Cited

U.S. PATENT DOCUMENTS

| | | | |
|---|---|---|---|
| 4,330,227 | 5/1982 | Raye et al. | 407/46 x |
| 4,363,576 | 12/1982 | Zweekly | 407/50 |
| 4,744,703 | 5/1988 | Cochran | 407/46 X |
| 4,887,945 | 12/1989 | Pano | 407/110 |

Primary Examiner—Larry I. Schwartz
Assistant Examiner—Julie R. Daulston
Attorney, Agent, or Firm—Burgess, Ryan & Wayne

[57] ABSTRACT

A metal cutting tool assembly comprising a tool block; a substantially planar adaptor to be screw-clamped to the tool block; first and second insert clamping jaws formed integrally with the adaptor and defining between them an insert receiving slot for receiving a cutting insert; a relatively narrow neck portion formed integrally with the adaptor and serving to couple the first jaw with the remainder of the adaptor and screw coupling means for clamping the adaptor to the tool block; the screw coupling means including aligned screw receiving bores formed respectively in the adaptor and the block and so directed that screw insertion of a clamping screw into the aligned bores effectively clamps the adaptor against the tool block and, at the same time, exerts a resultant force on a first jaw so as to pivot it about the neck portion into effectively clamping the insert against the second jaw.

5 Claims, 6 Drawing Sheets

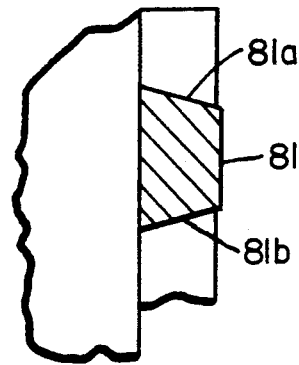
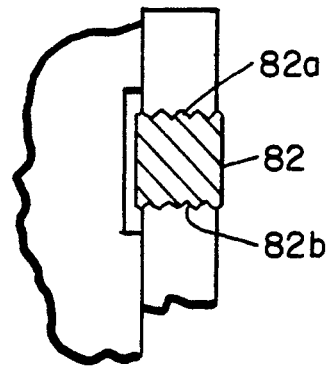
FIG. 8a     FIG. 8b
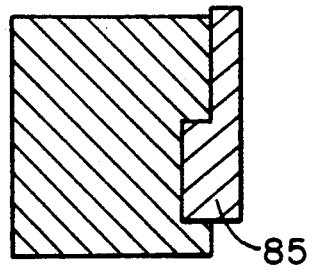
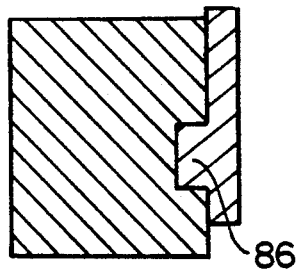
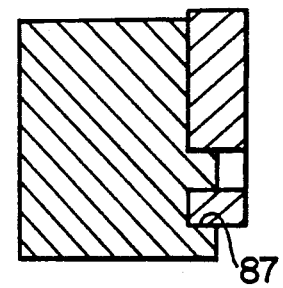
FIG. 9a     FIG. 9b     FIG. 9c

CUTTING TOOL SYSTEM HAVING AN EXCHANGEABLE ADAPTOR

FIELD OF THE INVENTION

This invention relates to a metal cutting tool assembly comprising a tool block and an exchangeable adaptor releasably secured to the tool block and to which a cutting insert is to be releasably clamped.

BACKGROUND OF THE INVENTION

The use of such metal cutting tool assemblies has been known for some time, particularly in connection with parting, grooving and face turning operations. The use of such assemblies, particularly with their readily exchangeable or replaceable adaptors, is advantageous when the same tool block is to be used for differing types of cutting inserts, and it is desired to be able to replace these cutting inserts without removing the block from the machine tool to which it is attached. Alternatively, situations may arise where the particular type of cutting operations require the use of differing types of tool blocks, albeit for the same type of cutting insert. In those circumstances, the use of a standard adaptor to which the cutting insert can be clamped is particularly advantageous for it allows for the ready coupling of the cutting insert via the standard adaptor to differing types of tool blocks.

Known adaptors of this kind are formed with a pair of integral jaws which define between them an insert receiving slot for receiving the cutting insert, means being provided for biasing the jaws towards each other so as to clamp the cutting insert in an operative position.

BRIEF SUMMARY OF THE INVENTION

It is an object of the present invention to provide a new and improved cutting tool assembly of the kind just described.

According to the present invention, there is provided a metal cutting tool assembly comprising a tool block; a substantially planar adaptor to be screw-clamped to the tool block; first and second insert clamping jaws formed integrally with the adaptor and defining between them an insert receiving slot for receiving a cutting insert; a relatively narrow neck portion formed integrally with the adaptor and serving to couple the first jaw with the remainder of the adaptor and screw coupling means for clamping the adaptor to the tool block;

characterised in that the screw coupling means includes screw receiving bores formed respectively in the adaptor and the block so as to be aligned with each other so as to have a common axis located in a pair of orthogonally directed planes respectively parallel to front and side faces of the tool block, said common axis defining respective primary and secondary angles with respect to an axis of intersection of said planes; the arrangement being such that screw insertion of a clamping screw into said aligned bores effectively clamps the adaptor against the tool block and, at the same time, exerts a resultant force on a first jaw so as to pivot it about the neck portion into effectively clamping the insert against the second jaw.

With such a cutting tool assembly in accordance with the invention, the angular disposition of the aligned bores ensures the simultaneous effective clamping of the jaws about the insert and at the same time, the effective clamping of the adaptor to the tool block.

Preferably, the bore in the adaptor is formed in adjacent edges of an elongated slit formed in the adaptor and extending from an edge portion of the adaptor to an inner end portion located adjacent an inner end of said insert receiving slot, said bore being defined by opposite, suitably shaped recesses formed in the edges of the slit. With such a preferred embodiment, the narrow neck portion is defined between the inner end of the slit and the inner end of the insert receiving slot. When a clamping screw having a tapering head is screwed into the bore formed in the tool block via the bore defined between the opposite recesses of the slit edges, the tapering head of the screw acts on the first jaw so as to cause it to pivot resiliently about its narrow neck portion so as to clamp the insert in position.

BRIEF SUMMARY OF THE DRAWINGS

Various embodiments of a metal cutting tool assembly in accordance with the invention will now be described by way of example and with reference to the accompanying drawings, in which:

FIG. 1b is a plan view of a tool block and adaptor forming part of the tool assembly shown in FIG. 1a;

FIGS. 8a and 8b illustrate schematically the use of the cutting tool assembly with inserts of differing shapes; and FIGS. 9a, 9b and 9c illustrate schematically respectively differing modifications of the mode of interengagement and support of the components of the cutting tool assembly.

DETAILED DESCRIPTIONS OF PREFERRED EMBODIMENTS

Figure 1A:
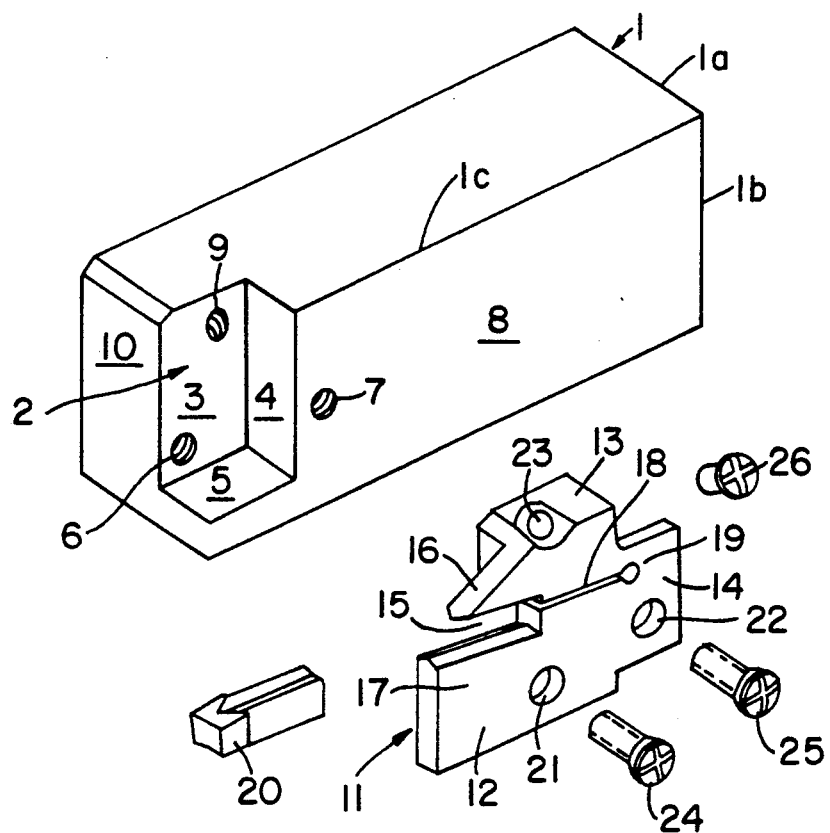
FIG. 1a is an exploded perspective view of one embodiment of a metal cutting tool assembly in accordance with the present invention.
Figure 2:
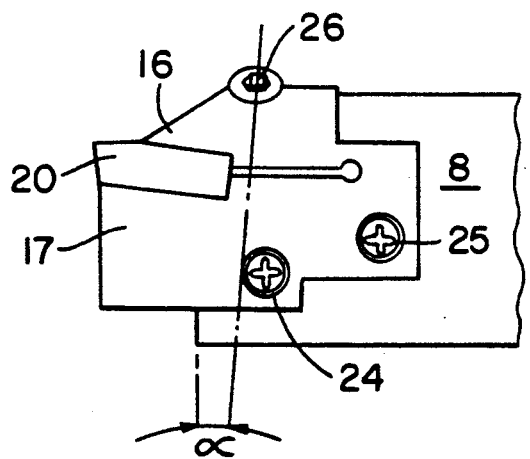
FIG. 2 is a side elevation of the metal cutting tool assembly shown in FIG. 1, when assembled.
Figure 1B:
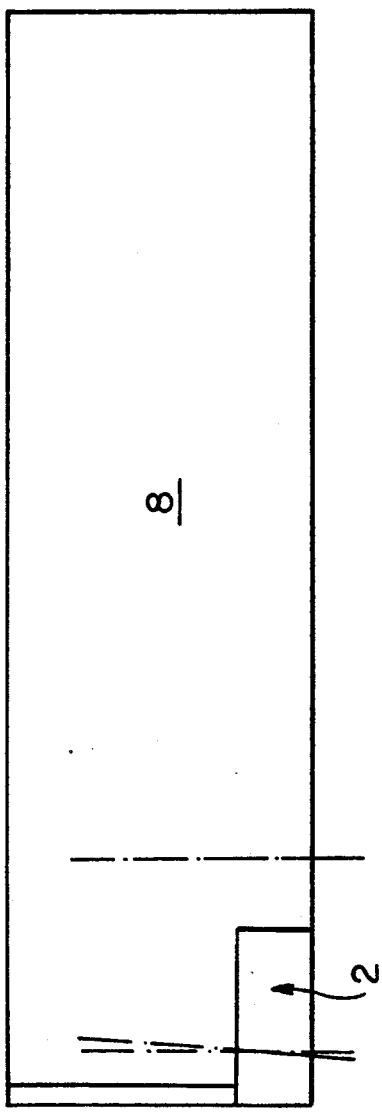
Figure 1B:
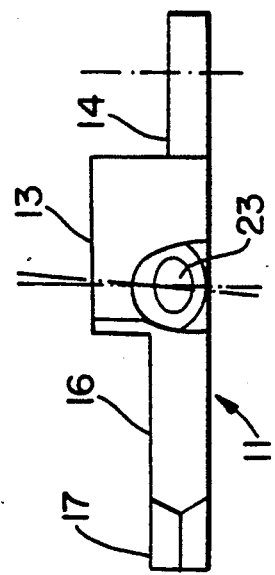
Figure 4:
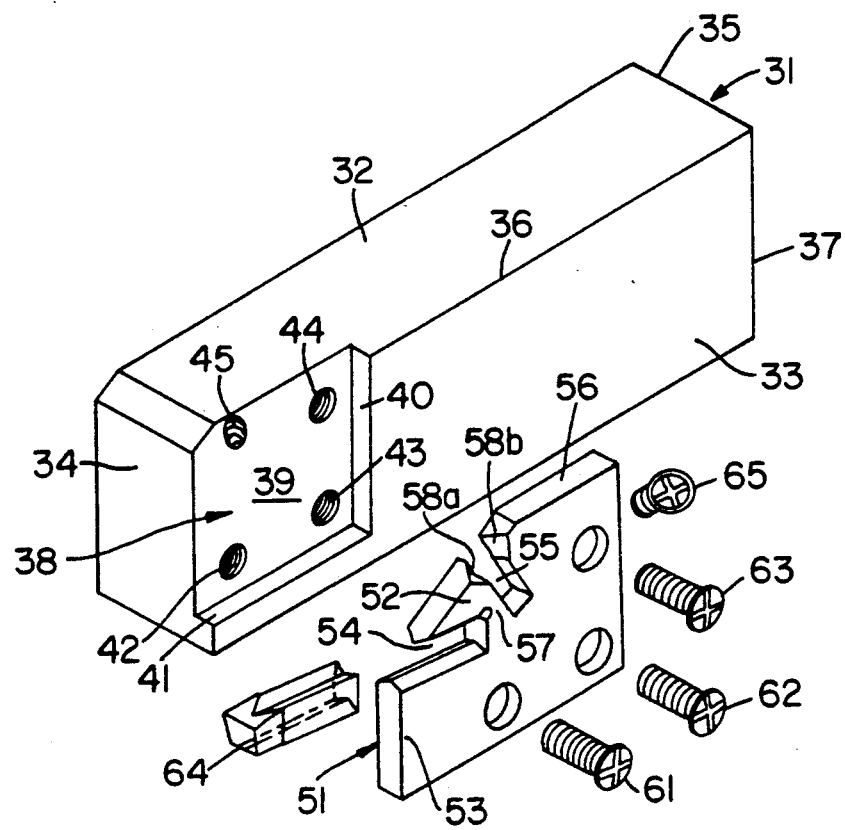
FIG. 4 is an exploded perspective view of a second embodiment of a metal cutting tool assembly in accordance with the invention.
Figure 3:
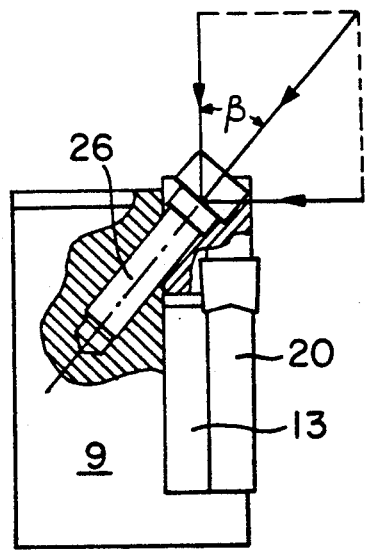
FIG. 3 is a partially sectioned front elevation of the metal cutting tool assembly shown in FIGS. 1 and 2.
Figure 5:
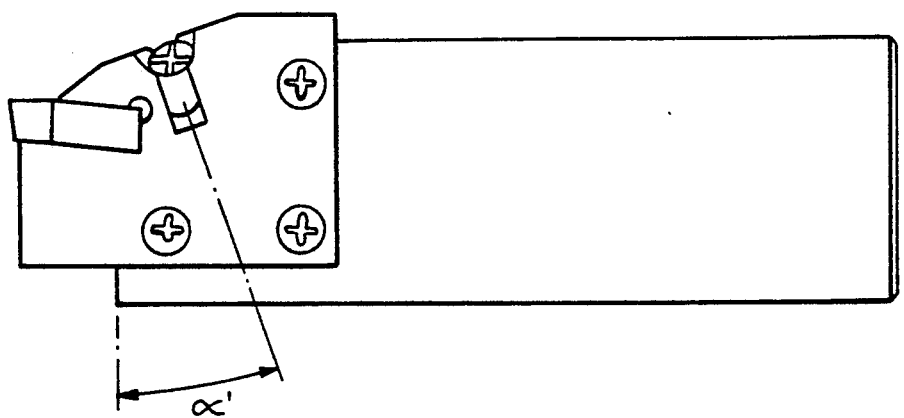
FIG. 5 is a side elevation of the assembled metal cutting tool assembly shown in FIG. 4.
Figure 6:
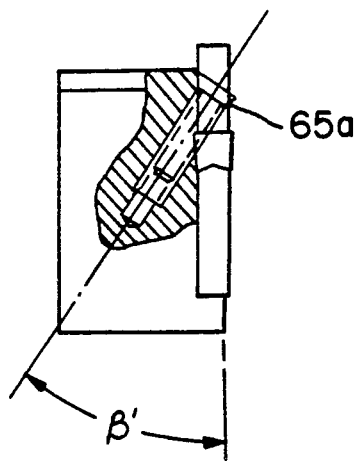
FIG. 6 is a partially sectioned front elevation of the metal cutting tool assembly shown in FIGS. 4 and 5.

In the embodiment shown in FIGS. 1, 2 and 3 of the drawings, an elongated tool block 1 of substantially rectangular cross-sectional shape is formed at a leading end thereof with a rectangular recess 2 defined by a rear wall 3, a side edge 4 and a base edge 5. In the following description, the spatial location of certain components associated with the block will be defined with reference to the three orthogonal axes of the block which are respectively parallel to the orthogonally disposed edges 1a, 1b and 1c of the block.

A pair of screw-threaded bores 6 and 7 extend inwardly into the block in a direction parallel to the edge 1a, the bore 6 extending into the block from the surface 3 whilst the bore 7 extends into the block from an external major surface 8 thereof.

A screw-threaded bore 9 extends into the block from the surface 3 so that, when viewed from the side surface 8, it subtends an angle $a$ (see FIG. 2) with respect to an axis of the block parallel to the edge 1b and, when viewed from a front surface 10 of the block, it subtends an angle β (see FIG. 3).

An adaptor 11 is formed of a substantially planar portion 12, an integrally formed, rearwardly projecting portion 13 and a trailing portion 14. The adaptor is formed with an insert receiving recess 15 which is defined between an upper clamping jaw 16 and a lower clamping jaw 17. The insert receiving recess 15 communicates with an elongated slit 18 formed in the adaptor, an end portion of the slit 18 defining with a rear end of the trailing portion 14 a resilient neck 19 of the adaptor.

Opposite edges of the jaws 16 and 17 are V-shaped so as to fit within corresponding V-shaped grooves formed in an elongated cutting insert 20 adapted to be received within the insert recess 15.

Clamping screw holes 21, 22 and 23 are formed in the adaptor 11 so that, when the adaptor is assembled on the tool block 8 with the projection 13 fitted within the recess 2, the holes 21, 22 and 23 are respectively aligned with the holes 6, 7 and 9 formed in the tool block 8.

With the adaptor and tool block clamped together by means of clamping screws 24, 25 and 26 as seen in FIG. 2 of the drawings, the effect of the screws 24 and 25 is simply to clamp the adaptor against the surface 3 of the recessed block 1. The effect of the clamping screw 26, however, is, on the one hand, to reinforce the clamping of the adaptor against the surface 3, together with the clamping of the lower surface of the adaptor 11 against the edge 5 of the recess, and a side surface of the adaptor against the edge 4 of the recess and, on the other hand, to exert a downwardly directed pivoting force on the jaw 16 about the narrow neck 19 into firmly clamping the insert 20 against the lower jaw 17. The development of this downwardly directed pivoting force arises in view of the fact that the slope of the aligned bores 9 and 23 are in two distinct directions when viewed respectively from the side face 8 and the front face 10. When this is taken together with the fact that the unthreaded clamping screw hole 23, allows in view of manufacturing tolerances, for the passage of the clamping screw 26 therethrough with a certain amount of play around the screw, it will be seen that the downwardly directed pivoting force is effective in closing the jaw 16 to pivot.

It is therefore ensured that the adaptor 11 is effectively and firmly clamped to the tool block 1 and that the insert 20 is firmly clamped between the jaws 16 and 17, without placing any undue stress on the resilient neck portion 19 of the adaptor 11.

Reference will now be made to FIGS. 4, 5, 6 and 9 of the drawings for a description of a modified form of cutting tool assembly in accordance with the present invention. The assembly comprises an elongated tool block 31 having a top surface 32, a side surface 33 and a front surface 34. Orthogonally directed edges 35, 36 and 37 of the tool block 31 are referenced and will be later referred to so as to define directions of the components associated with the tool block.

A rectangular recess 38 is formed in a leading end of the tool block 31 and is defined by a rear surface 39, a side edge 40 and a base edge 41. Three threaded bores 42, 43 and 44 extend into the tool block from the surface 39 in directions parallel to the edge 35 of the tool block. A fourth threaded bore 45 extends into the tool block in a direction which, when viewed from the surface 33 of the tool block (see FIG. 5), defines an angle α' with the axis of the tool block parallel to the edge 37 whilst, when viewed from the end face 34 (see FIG. 6), defines an angle β' with reference to an axis parallel to the edge 37.

A substantially planar adaptor 51 is formed with an upper clamping jaw 52 and a lower clamping jaw 53 which define between them an insert receiving recess 54.

An elongated slot 55 is formed in the adaptor 51 and is angularly directed with respect to an upper edge 56 of the holder, which slot extends from the edge 56 to a region adjacent an inner end of the recess 54 so as to define a narrow, flexible neck 57 of the holder.

A pair of shaped recesses 58a and 58b are formed in opposite edges of the slot 55.

The adaptor 51 is secured to the tool block 13 by being placed in position in the recess 38 and being clamped initially by clamping screws 61, 62 and 63.

An elongated cutting insert 64 is now placed in position within the insert receiving recess 54 and a clamping screw 65 having a tapering head 65a (see FIG. 6) is screwed into the slanting bore 45 via the shaped recesses 58a and 58b, and as this screw 65 is tightened it is effective in pivotally displacing the jaw 52 about its flexible neck portion 57 so as to clamp the insert 64 between the jaws 52 and 53 and, at the same time, to complete the effective clamping of the adaptor 51 against the tool block 1.

The use of a taper headed screw 65 in the manner described above so as to ensure the pivotal displacement of the jaw 52 about the narrow neck portion 57 is itself known. It is also known that, for this purpose, the shaped recesses 58a and 58b should not conform exactly with the shape of the tapered head 65a, but should diverge from this shape in known fashion so as to allow for regional clearances and regional points of contact. The particular location of these points of contact and their orientation with respect to the direction of the slanted aperture 45, determines the direction of and the forces acting on the jaw 52 so as to ensure the firm clamping of the insert 64 between the jaws 52 and 53.

Figure 7:
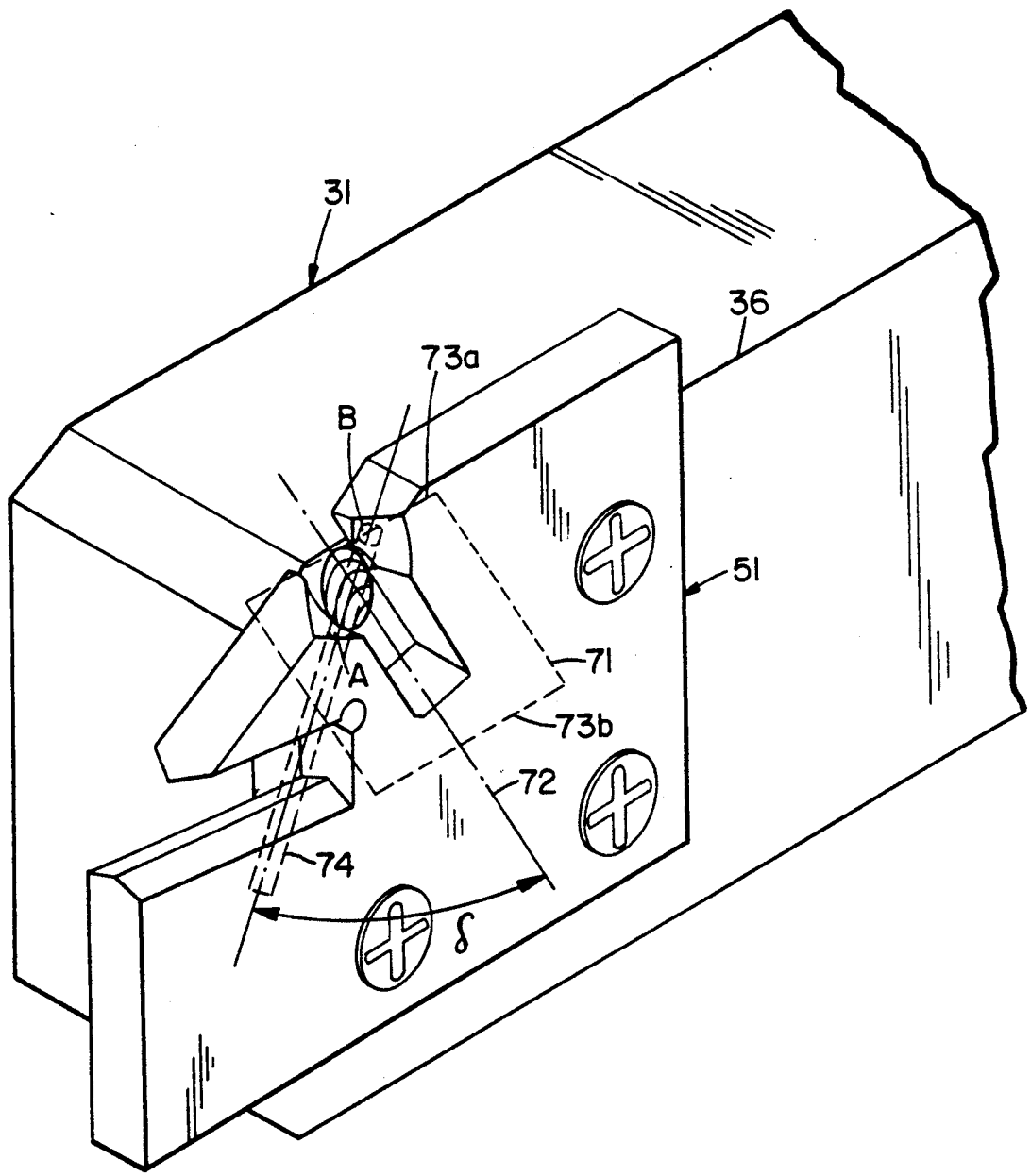
FIG. 7 is a schematic representation illustrating angular directions of the coupling components of the cutting tool assembly shown in FIGS. 4 and 5.

Reference will now be made to FIG. 7 of the drawings, in which is shown schematically an imaginary plane 71 in which is located an axis 72 of the slanted bore 45 (and, in consequence, of the clamping bolt 65). The plane 71 is so located that its longitudinal edges 73a and 73b are located parallel to the longitudinal edge 36 of the tool block 31. If now we consider that the tapered head of the clamping screw 65 bears against the surfaces 58a and 58b at respective locations A and B, then a plane 74 which passes through the locations A and B intersects the plane 71 at an angle δ and the magnitude of this angle influences the magnitude of the force which serves to clamp the adaptor 51 to the tool block 31 and therefore the magnitude of the force which biases the jaw 52 into clamping the insert 64 within the insert receiving recess 54.

In one specific example of a cutting tool assembly of the kind just now described with reference to FIGS. 4, 5, 6 and 7 of the drawings, and where the angle δ was 15°, the angular direction of the force acting on the holder, when viewed from the front 34 of the tool block is represented as $F_f$, whilst the angular direction of this force when viewed from the side face 33 of the tool block is represented as $F_s$.

The following values for $F_f$ and $F_s$ for differing values for α, β and screw head taper are as follows:

| α° | β° | Screw Head Taper | F$_f$° | F$_s$° |
|---|---|---|---|---|
| 10° | 25° | 40° | 51.82° | 68.42° |
| 40° | 55° | 60° | 70.41° | 62.22° |

Whilst in the embodiments specifically described above the clamping jaws are formed with elongated, V-shaped ribs adapted to mate within corresponding V-shaped grooves formed in the insert so as to ensure the effective, secure location of the insert within the insert recess, FIG. 8a shows how an insert 81, having inclined upper and lower edges 81a and 81b, can be effectively clamped using an adaptor in accordance with the invention, whilst FIG. 8b shows how an insert 82, having upper and lower serrated edges 82a and 82b, can be clamped.

Furthermore, FIGS. 9a and 9b show how the adaptor can be additionally supported within the tool block by being provided with a rearwardly extending projection 85 (formed at its lower extremity in FIG. 8a and with a projection 86 formed at an intermediate position in FIG. 8b), which projection is suitably located within an appropriate recess formed in the tool block. Equivalently, the adaptor can be formed with an appropriate recess 87 within which is located a projection extending from the tool block as shown in FIG. 8c.

I claim:

1. A metal cutting tool assembly comprising a tool block; a substantially planar adaptor to be screw-clamped to the tool block; first and second clamping jaws formed integrally with the adaptor and defining between them an insert receiving slot for receiving a cutting insert; a relatively narrow neck portion formed integrally with the adaptor and serving to couple the first jaw with the remainder of the adaptor and screw coupling means for clamping the adaptor to the tool block; wherein the screw coupling means includes unthreaded and threaded screw receiving bores formed respectively in the adaptor and the block so as to be aligned with each other so as to have a common axis located in a pair of orthogonally directed planes respectively parallel to the front and side faces of the tool block, said common axis defining respective primary and secondary angles with respect to an axis of intersection of said planes; and a clamping screw insertable into said bores so as to be screwed into said threaded bore leaving some play with defining walls of said unthreaded bore; the arrangement being such that the screw insertion of said clamping screw into said bores effectively clamps the adaptor against the tool block and, at the same time, by displacing the axis of the unthreaded bore with respect to that of the threaded bore with the two axes remaining parallel to each other, exerts a resultant force on a first jaw so as to pivot it about the neck portion into effectively clamping the insert against the second jaw.

2. An assembly according to claim 1, wherein said insert receiving slot communicates at an end thereof with one end of an elongated slit, an opposite end of said slit defining with an edge portion of said adaptor, said neck portion.

3. An assembly according to claim 1 or 2, said adaptor is formed with a relatively thickened, rearwardly extending portion adapted to be fitted in a corresponding recess formed in an end portion of said tool block and wherein said screw receiving bore is formed in said relatively thickened portion.

4. An assembly according to claim 1, wherein said adaptor is formed with an elongated slit extending from an edge portion of the adaptor to an inner end portion located adjacent an inner end of said insert receiving slot, said neck portion being defined between said inner end portion of said slit and said inner end of said insert receiving slot, shaped recesses being formed in adjacent edges of said slit so as to define between them the bore in the adaptor, said clamping screw being formed with a tapering head adapted to bear against said shaped recesses.

5. An assembly according to claim 1, wherein said adaptor is of substantially planar shape and that said tool block has formed in an end thereof a recess in which said adaptor is to be fitted.

* * * * *